CONVERSATION TIMING IN TELEPHONE SYSTEMS

Filed Jan. 5, 1950 5 Sheets-Sheet 1

INVENTOR.
CLARENCE E. LOMAX

BY

ATTORNEY

INVENTOR.
CLARENCE E. LOMAX
BY
Chas. W. Cauly
ATTORNEY

INVENTOR.
CLARENCE E. LOMAX
BY
[signature]
ATTORNEY

July 28, 1953 C. E. LOMAX 2,647,163

CONVERSATION TIMING IN TELEPHONE SYSTEMS

Filed Jan. 5, 1950

5 Sheets-Sheet 4

INVENTOR.
CLARENCE E. LOMAX

BY Chas. W. Cassidy

ATTORNEY

INVENTOR.
CLARENCE E. LOMAX
BY
Chas. W. Cassidy
ATTORNEY

Patented July 28, 1953

2,647,163

UNITED STATES PATENT OFFICE 2,647,163

CONVERSATION TIMING IN TELEPHONE SYSTEMS

Clarence E. Lomax, Chicago, Ill., assignor to Automatic Electric Laboratories, Inc., Chicago, Ill., a corporation of Delaware Application January 5, 1950, Serial No. 136,922

14 Claims. (Cl. 179—7.1)

Figure 1:
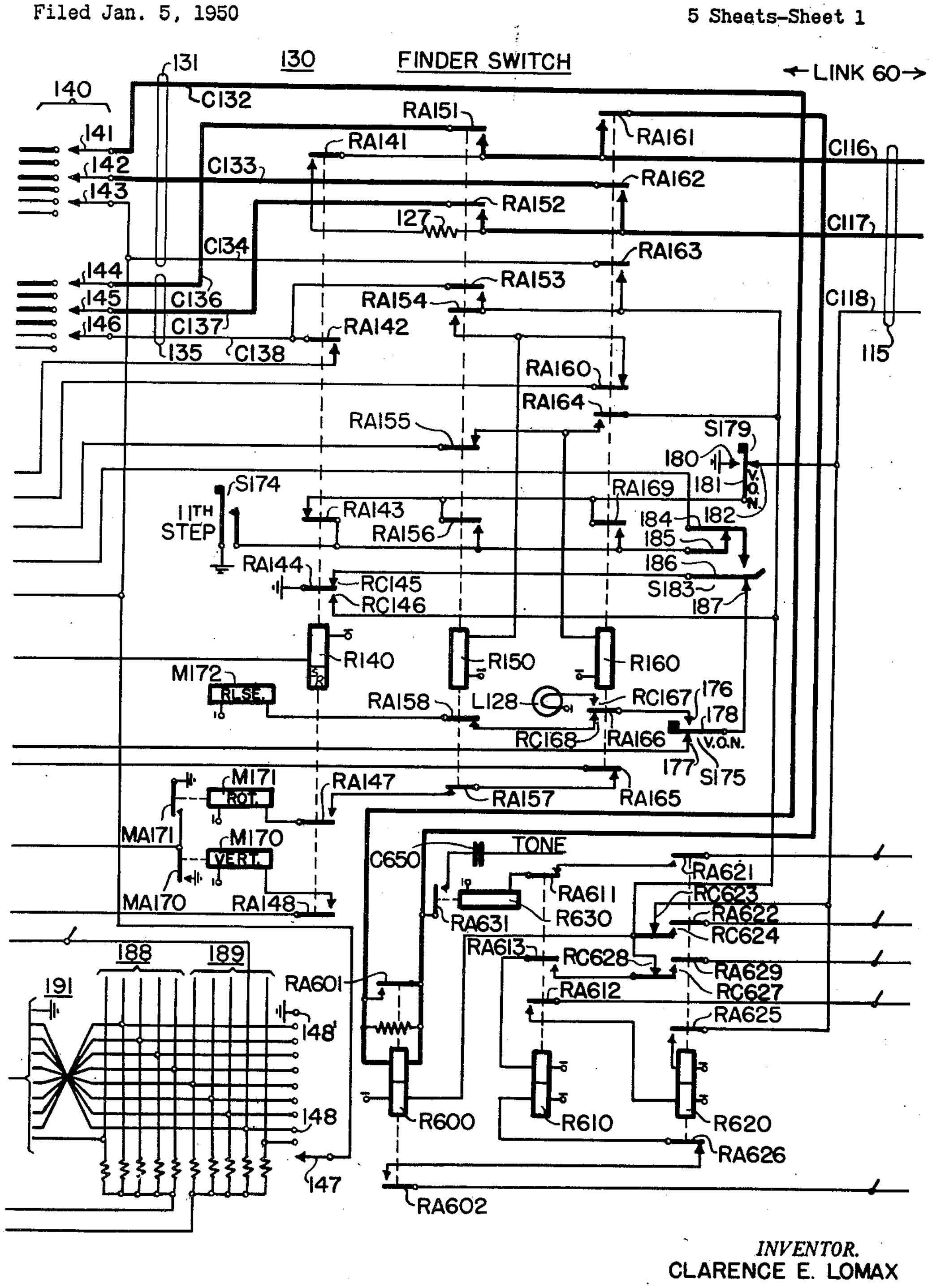

This invention relates in general to telephone systems and more particularly to telephone systems which utilize conversation timing of established telephone connections, the connection being automatically disconnected a certain interval of time after it was first established.

The number of switches required in an automatic telephone exchange to give proper service is determined by the number of calls made during the busy hour or hours and the length of time the connection is held during this period. The generally accepted formula is that one eighth of the total twenty-four hour daily load is carried during the one busiest hour of the day. If the length of time of the calls during the busy periods could be shortened, a greater number of calls could be completed over the same number of switches and also certain subscribers would be induced to make their calls during non-busy hours so as to have unlimited conversation time, the combined result being a substantial reduction in the number of switches over the number required to give proper service when no periodic conversation timing is employed. It should be realized that it would not be advisable to subject certain calls, such as calls from business establishments, to conversation timing at any time of the day and the same applies to toll calls made from any subscriber including those subscribers normally affected by conversation timing. It would also be advisable to allow for a disabling of the conversation timing apparatus during the "peak load" periods should it be warranted by a light traffic load during the normally busy period. It is with these foregoing facts in mind that this invention was conceived.

One object of this invention is to provide conversation timing with automatic disconnect, controlled in line finders or the primary trunks of automatic switch trains, of telephone connections established by certain subscribers having access to the linefinders or primary trunks, while similar connections established by certain other subscribers with access to the same linefinders or primary trunks are not subject to the conversation timing.

Another object of the invention is to provide that the conversation timing is operative only during certain periods of the day, normally the periods when the switching system is carrying the heaviest daily load.

Another object of the invention is to prevent conversation timing on the connections normally subject to it when the call is of a special class, such as a toll call, even during the "peak load" periods.

Another object of the invention is to provide an operator or other proper person with control of the conversation timing equipment to such an extent that they could disable the conversation timing equipment at any time during the "peak load" period in case a light traffic condition warranted no conversation timing during a normally busy period.

One feature of this invention is the provision, in a linefinder, of a circuit designed to automatically interrupt the talking connection established through the linefinder a certain period of time after the connection was first established but only during certain periods of the day.

Another feature of this invention is the provision, in a 200 point linefinder, of a circuit designed to automatically interrupt the talking connection established through the linefinder a certain period of time after the connection was first established, the interrupting circuit being operative only on connections established from subscriber lines in one of the hundreds groups of lines having access to the linefinder, the second hundred group of lines having an unlimited time to retain the connections established from them.

Another feature of this invention is the provision, in a step-by-step Strowger linefinder, of a circuit designed to automatically interrupt the talking connection established through the linefinder a certain period of time after the connection was first established, the interrupting circuit being operative only on connections established from subscribers lines on certain vertical levels of the contact banks of the switch, the subscribers lines on the other levels of the switch bank having an unlimited conversation time period.

Another feature of this invention is the provision, in a linefinder, of a circuit designed to automatically interrupt the talking connection established through the linefinder a certain period of time after the connection was first established, the interrupting circuit being operative on certain subscribers lines regardless of the hundreds group or bank level they are in, the application of the interrupting circuit being determined by the bank wiring of a fourth line bank contact provided with every subscriber line having access to the linefinder.

Another feature of this invention is the provision, with the conversation timing circuit in the three methods above for discriminating between subscribers having access to the linefinder, of a timing device for rendering the conversation timing circuit operative only during certain periods of the day, for instance two hours in the morning and two hours in the evening.

Another feature of this invention is the provision of a key circuit at an operator's position or exchange attendant's desk for disabling the conversation timing circuit during light traffic load periods.

The invention will appear more clearly from the following detailed description when taken in connection with the accompanying drawings, showing by way of example, a preferred embodiment of the inventive idea.

Figs. 1, 2, 3, 4 and 5 depict the telephone system which best illustrates the present invention, a system very similar to the telephone system shown in the Patent 2,214,908 of Lomax and Bakker, September 17, 1940, the two systems being identical except for the modifications incorporated to show the present invention. For simplicity the entire system shown in Patent 2,214,908 will not be again shown in detail and described but only those parts of the system which will help to disclose the present invention will be shown in detail. The designation numbering of the component parts of the system shown in this invention is made to correspond in the greatest degree possible to the designation numbering of the similar component parts of Patent 2,214,908 and a reference to the above-named patent will quickly disclose their inter-relationship with the parts of the system not shown in detail.

Figure 3:
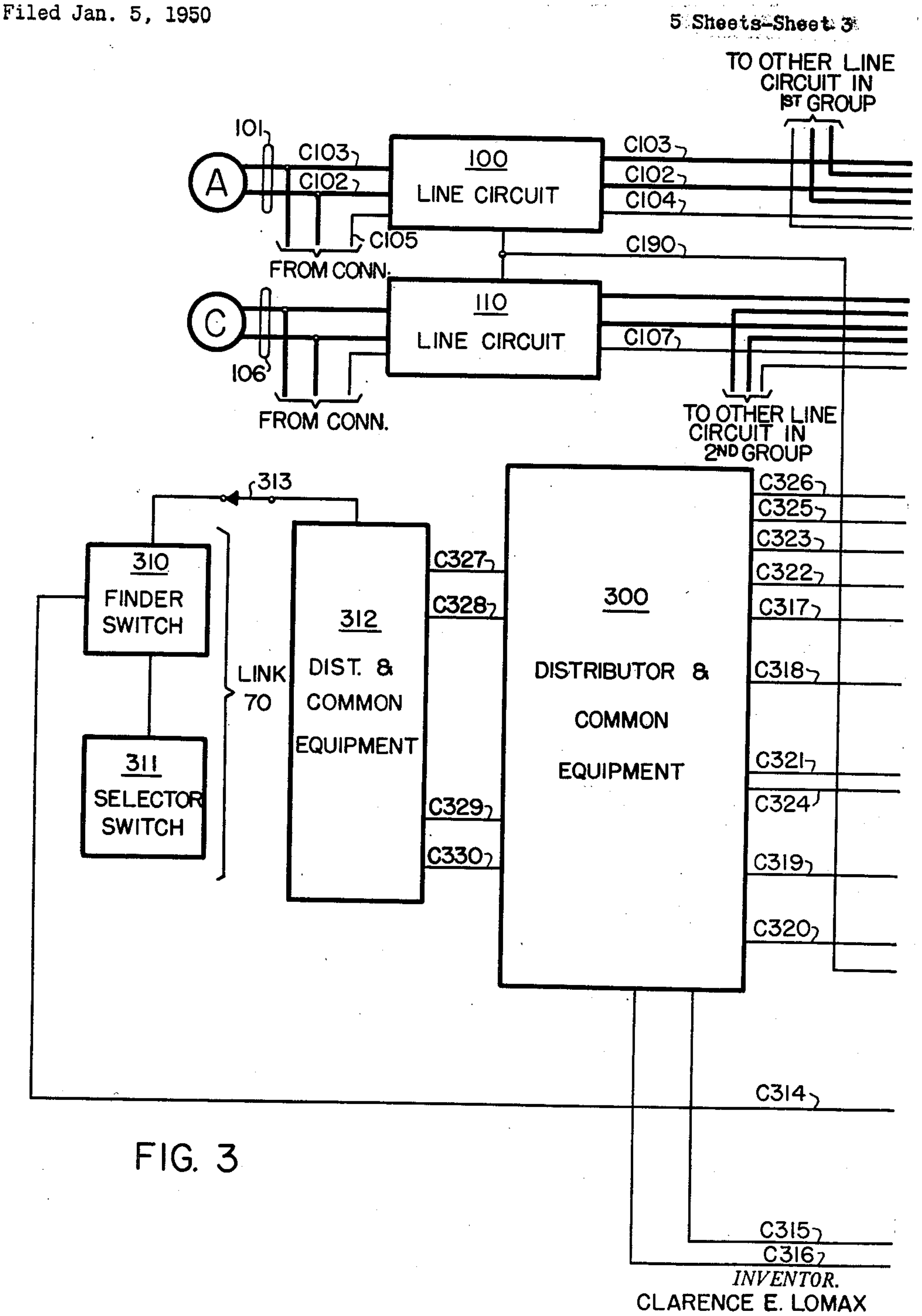

More particularly, Fig. 3 in part illustrates the subscriber line 101, one of the lines in the first hundreds group of lines in a particular 200 line group; line circuit 100 associated with line 101; subscriber line 106, one of the lines in the second hundreds group of lines; and line circuit 110 associated with line 106.

Figure 2:
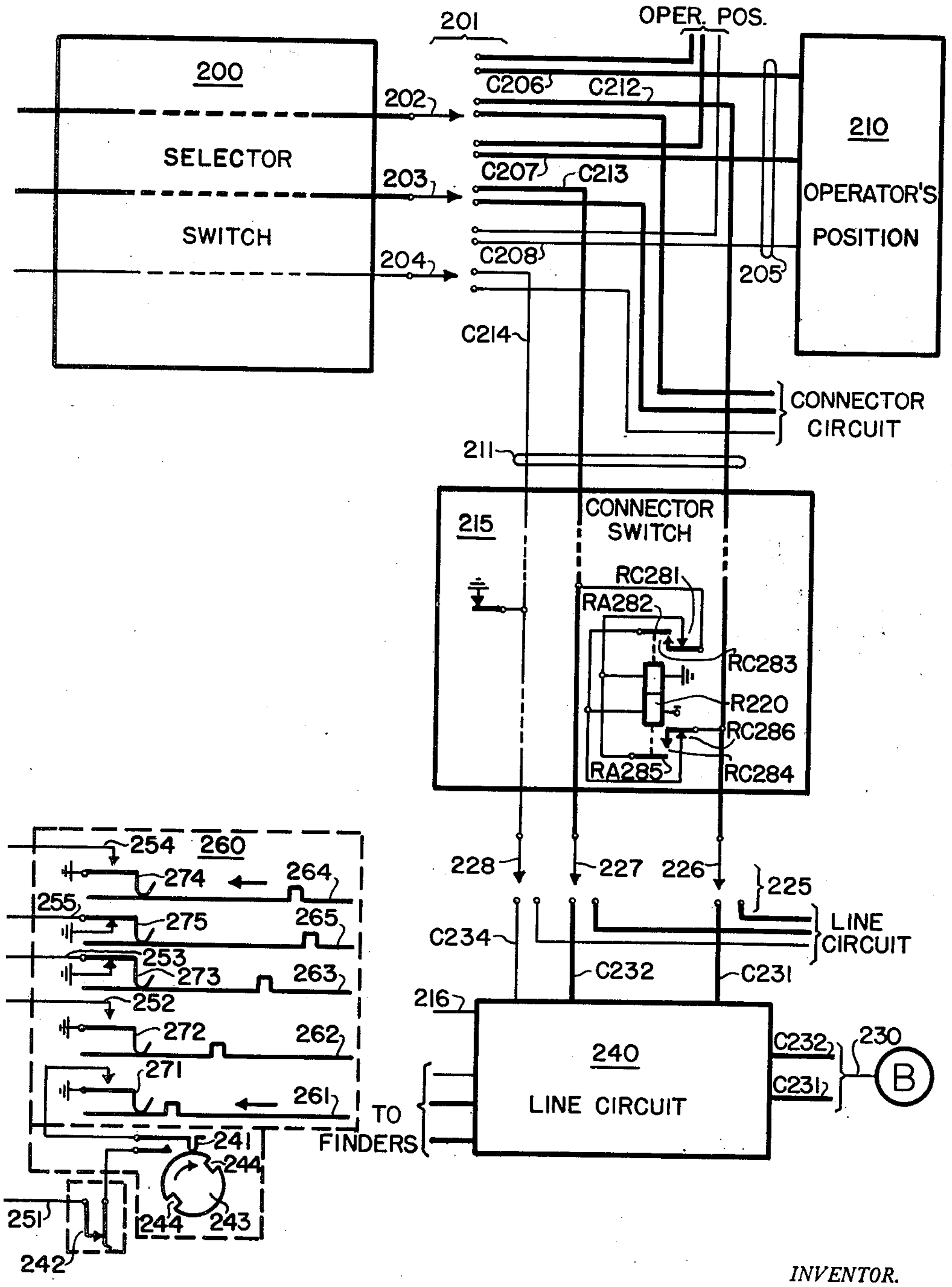

Fig. 2 illustrates the selector switch 200, a part of the finder-selector link, including the switching mechanism 201; the operator's position 210; the connector switch 215, one of the first group of connectors accessible to the first group of links, and connector switching mechanism 225; the B subscriber's line 230; line circuit 240 associated with line 230; timing device 260; and timing cam 243 and associated equipment.

Fig. 3 in part also illustrates the finder switch 310 and selector switch 311 which make up the link 70 of the system, link 70 being included in the second group of links which normally serve a second portion of the 200 lines; the distributor and common equipment 312 associated with the second group of links which normally assigns idle links in the second group to calling lines in the second portion but will, when all the links in the first group of links are busy, assign idle links in the second group of links to calling lines in a first portion of the 200 lines; and the distributor and common equipment 300 associated with the first group of links which normally assigns idle links in the first group of links to calling lines in a first portion of the 200 lines but which will, when all the links in the second group of links are busy, assign idle links in the first group of links to calling lines in the second portion of the 200 lines. Fig. 3 is associated with the finders of Figs. 1, 4 and 5.

Fig. 1 illustrates a finder switch 130 similar to the finder switch 130 of the above-named patent with a few modifications, the finder switch being a part of the link 60 which is included in the first group of links and provided with the distributor and common equipment 300. This finder comprises a conversation timing feature which times and disconnects calls made from subscribers lines in the first hundreds group of subscriber lines and is inoperative on calls from the second hundreds group of lines.

Figure 4:
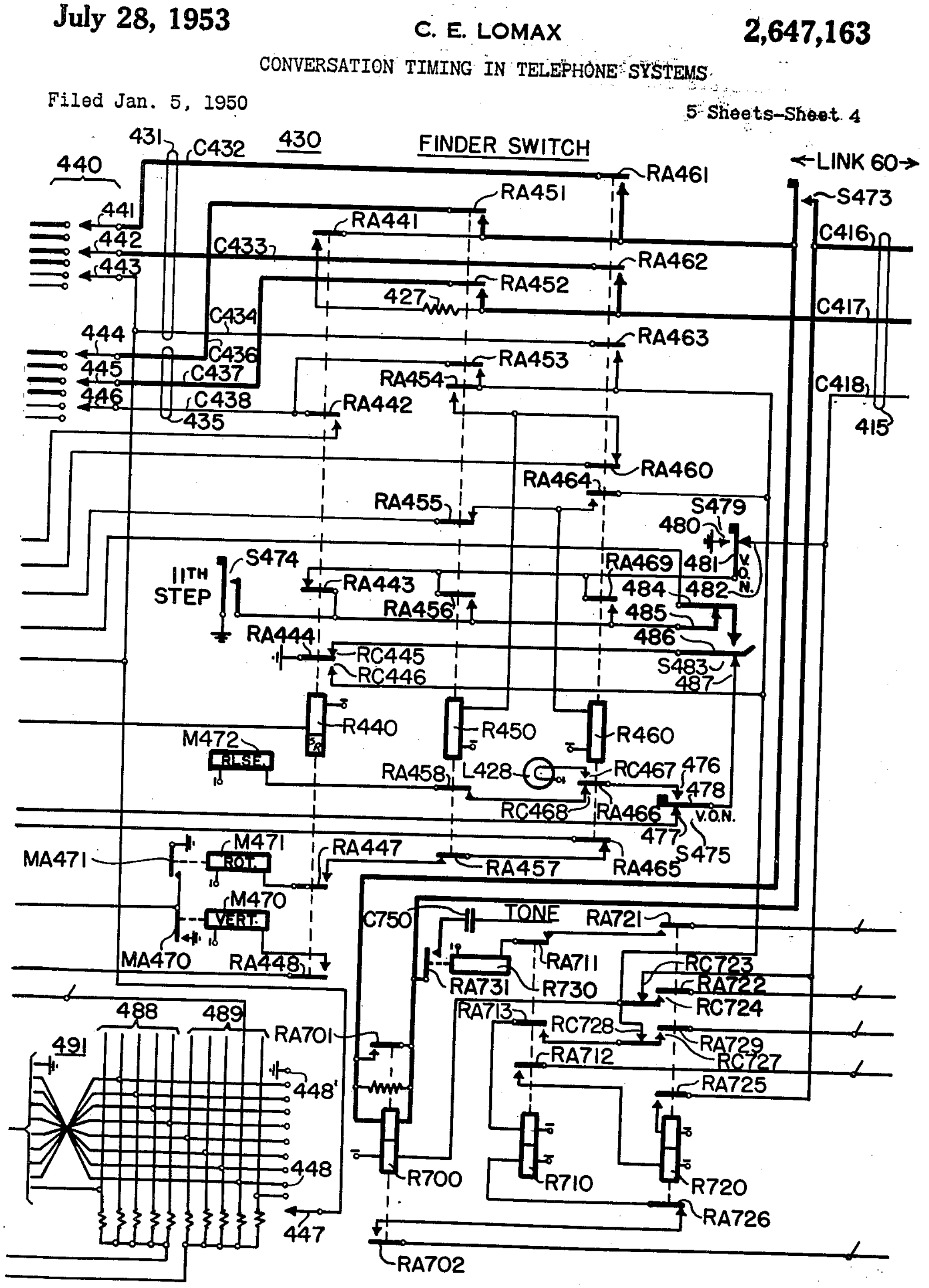

Fig. 4 illustrates a finder switch 430 similar to the finder 130 of Fig. 1 modified to provide discrimination as to conversation timing of calls on the basis of the contact bank level of the Strowger switch, shaft springs S473 being provided to accomplish this discrimination. This finder of Fig. 4 is substituted in link 60 for the finder of Fig. 1 to show the modification.

Figure 5:
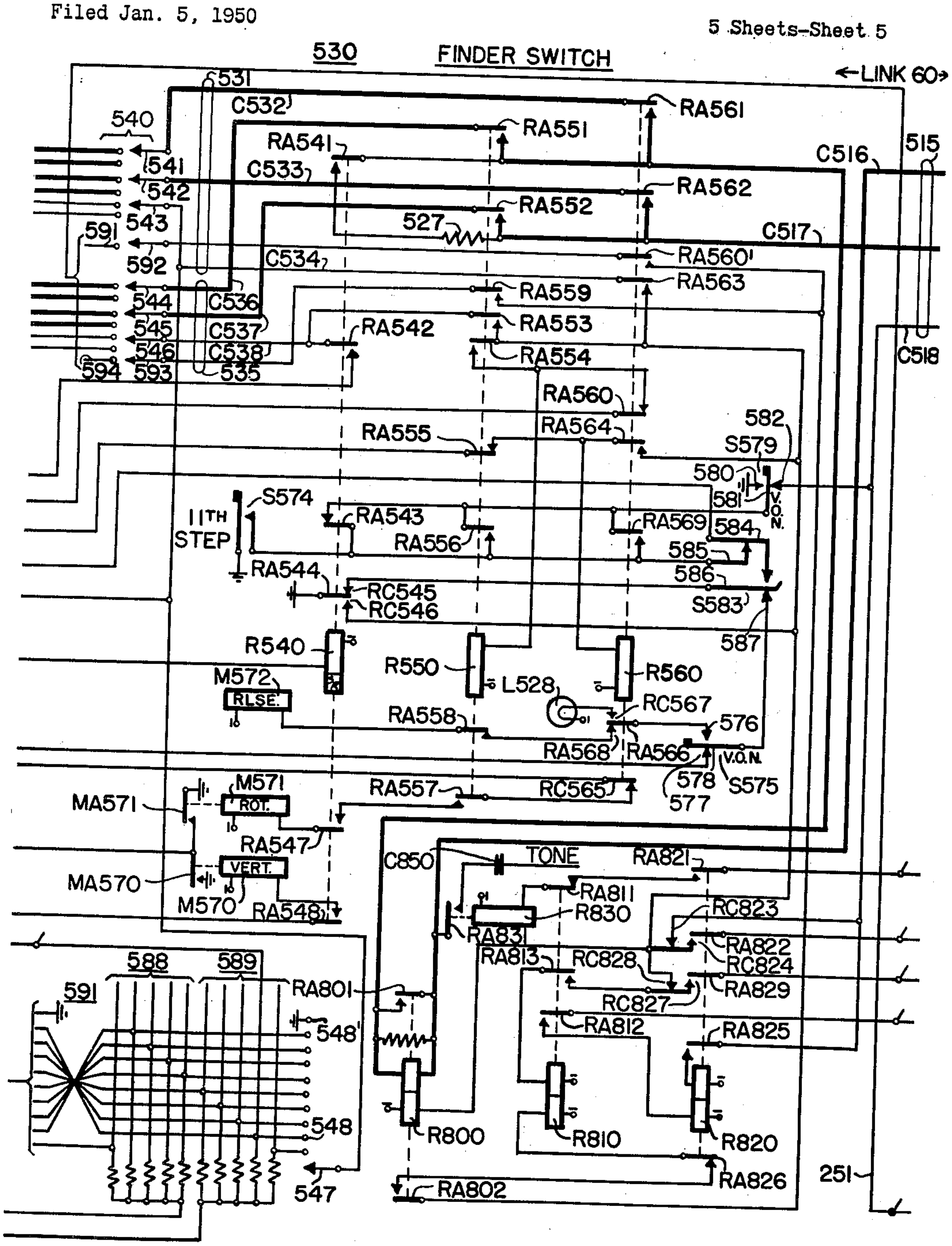

Fig. 5 illustrates a finder circuit 530 similar in most respects to the finders of Figs. 1 and 4 but modified to provide discrimination between individual subscriber lines rather than group discrimination by means of a fourth bank contact in each line bank contact set. This finder of Fig. 5 is substituted in link 60 for the finder of Fig. 1 to show a further modification.

Figs. 1, 2 and 3 in conjunction form one method for utilizing this invention. Figs. 4, 2 and 3 illustrate a second method and Figs. 5, 2 and 3 show a third method.

Referring now to Figs. 1, 2 and 3, when the subscriber at the calling substation A initiates a call over the line 101, the line circuit 100 operates to ground control conductor C105 to mark line 101 as busy to the connector switches having access thereto, applies battery potential to the control conductor C104 to mark the rotary positions of the contact sets in the contact banks of the Strowger mechanisms included in the finder switches terminating the line 101, and grounds control conductor C190 to thereby cause ground potential to be applied by way of the circuit network 191 to the start conductor C316 extending to the distributor 300 and to also cause the ground potential to mark, by way of circuit network 191 and the contacts in the vertical banks in the Strowger mechanisms included in the finder switches, the levels wherein line 101 is terminated, the contact in the vertical bank in the Strowger mechanism 140 included in the finder switch 130 being indicated at 148.

The ground closed to the control conductor C190 and by way of circuit network 191 to the start conductor C316 initiates operation of the distributor 300, thereby to cause the preselected idle one of the first group of links to be assigned to the use of the calling subscriber line 101, in this case link 60. More particularly, distributor 300 operates to place ground potential on finder start conductor C318 and ground potential on vertical conductor C320. Ground potential on conductor C318 causes relay R140 to operate. Relay R140 on operating closes a path between line conductors C116 and C117 by way of contacts RA141 and resistance 127 to seize the selector circuit 200, closes ground to the control conductor C118 by way of contacts RA144, RC146, RC624 and RC623, closes conductor C138 to the distributor 300 by way of the second test conductor C326 at RA142, prepares the circuit from the rotary magnet M171 to the distributor 300 by way of RA147, RA157, RA165 and rotary conductor C324, and closes the circuit from vertical conductor C320 to the finder vertical magnet M170 through contacts RA148. The ground closed to conductor C118 thru RA144 and RC146 energizes the lower winding of the electro-polar relay R600 but this electro-polar relay is so designed that it will not operate on its lower winding alone and so remains unoperated at this time. The ground potential on the vertical conductor C320 causes the vertical magnet M170 to operate to step the Strowger switch mechanism 140 one step in the vertical direction and to connect, at MA170, ground to interrupter conductor C319. The ground connected to interrupter conductor C319 causes the distributor 300 to operate to remove the ground from vertical conductor C320 to cause the vertical magnet M170 to restore, thereby removing the ground at MA170 from conductor C319. The removal of ground from conductor C319 causes the distributor 300 to operate to reconnect ground to conductor C320 to again cause the vertical magnet M170 to operate to step the Strowger switch mechanism 140 an additional step in the vertical direction and to reconnect ground to conductor C319 by way of MA170. The above cycle of operations is continued, the vertical magnet M170 and the distributor 300 interacting, to step the switch mechanism 140 in a vertical direction until the vertical wiper 147 engages the contact in the vertical bank associated therewith having marking ground potential thereon. In the present instance, the vertical wiper 147 is driven vertically two steps at which time it engages contact 148 having the marking ground potential thereon. This ground on conductor C190 from the line circuit 100 is closed thru contact 148 and wiper 147 to the distributor 300 by way of first test conductor C317. This ground on first test conductor C317 causes the distributor 300 to operate to remove the ground from vertical conductor C320 so that the vertical magnet M170 will restore and also to connect ground on rotary conductor C324.

It is noted that when the switch mechanism 140 of the finder 130 is operated away from its normal position by the first operation of the vertical magnet M170, the sets of off-normal switch springs S175 and S179 are actuated. More specifically, the switch spring 181 disengages from spring 182 and engages spring 180 and spring 178 disengages from spring 177 and engages spring 176. Their functions will become apparent hereinafter.

This ground on rotary conductor C324 from the distributor 300 is closed to the rotary magnet M171 by way of RA165, RA157 and RA147. When energized over the above traced circuit, the rotary magnet M171 operates to step the Strowger switch mechanism 140 of the finder switch 130 one step in the rotary direction and to connect, at MA171, ground to interrupter conductor C319. This ground on conductor C319 causes the distributor 300 to operate to disconnect the ground from rotary conductor C324 to thereby cause the rotary magnet M171 to restore. Upon restoring, magnet M171 removes ground, at MA171, from interrupter conductor C319 to cause the distributor 300 to operate to re-connect ground to rotary conductor C324 and thus re-energize the winding of the rotary magnet M171. The rotary magnet M171 operates to cause the switch mechanism 140 to take an additional step in the rotary direction and to re-connect ground to interrupter conductor C319. The rotary magnet M171 and distributor 300 continue to interact in the manner described above until the switch mechanism 140 is rotated to the position of the contact set terminating the calling subscriber line 101, at which time the wiper 143 of the upper wiper set engages the contact terminating the control conductor C104 of line 101, assuming that the line 101 is accessible to the upper wiper set of the switch mechanism 140, whereupon a circuit is completed from the distributor 300 for seizing the calling subscriber line 101 by way of control conductor C104, wiper 143, and first test conductor C317. The distributor 300 operates to open the circuit to the rotary magnet M171 over rotary conductor C324 to prevent further operation of the rotary magnet and closes ground to the conductor C323. Ground on the conductor C323 closes the circuit to switching relay R160 by way of RA155. Relay R160 operates, opens a further point in the circuit to the rotary magnet M171 at RA165, and closes a holding circuit to itself from ground by way of RA144, RC146 and RA164. Upon operating, switching relay R160 also connects a first set of conductors 131 terminated by the upper wiper set to the trunk line 115 extending between the finder switch 130 and selector switch 200. Specifically, the conductors C133 and C134 of the conductor set 131 are respectively connected at RA162 and RA163 to the conductors C117 and C118, respectively, of the trunk line 115 and conductor C132 of the conductor set 131 is connected thru the upper winding of electro-polarized relay R600 at RA161 to the conductor C116 of the trunk line 115. Ground potential standing on line conductor C117 and battery potential standing on line conductor C116 in the selector 200 at this time energize the upper winding of relay R600 but the electro-polar relay R600 is so designed that, with the circuit to the upper winding closed in such a manner as described, the field set up by the upper winding opposes the field set up by the lower winding and the relay R600 will not operate. Relay R600 will only operate when the battery potential is reversed on the line conductors C117 and C116 as will hereinafter be described.

Also, upon operating, relay R160 opens a part of the incomplete circuit to the release magnet M172 at RA166 and RC168 and prepares a part of the circuit to supervisory lamp L128 thru RA166 and RC167, interrupts at RA160 a point in the circuit for energizing relay R150 from the distributor 300 over conductor C325 thereby to prevent operation of the switching relay R150 at this time, and closes ground to the distributor 300 over guard conductor C322 thru switch springs 180 and 181, RA169, and switch springs 184 and 185. This ground closed to the guard conductor C322 causes the release of the distributor 300 which then operates to locate the next idle link circuit available to the distributor in accordance with the pre-selecting feature of this linefinder system and also marks this link 60 busy to the distributor 300 during subsequent selecting operations of the distributor 300 while searching for idle links in the first group of links.

Upon this release of the distributor 300, ground is removed from start conductor C318 in the distributor 300 and relay R140 restores, interrupts the first-mentioned path between line conductors C116 and C117 of trunk line 115 at RA141, closes an alternate path at RA143 for applying the busy marking ground potential to guard conductor C322 from ground thru switch springs 180, 181, 185 and 184, interrupts points in the circuits to the vertical magnet M170 and rotary magnet M171 at RA148 and RA147 respectively, and closes a circuit to the supervisory lamp L128 at RA144 by way of RC145, switch springs 186, 187, 178 and 176 and RA166 and RC167. The lighted lamp L128 indicates to the exchange attendant that the link is in use. Relay R140 on restoring also removes ground at RC146 from the conductor C118 and at this time relay R160 is held operated and the upper winding of relay R600 held energized by ground on the conductor C118 from the selector circuit 200, the selector circuit 200 in turn being held under control of the subscriber substation A over the line loop in a well known manner.

At this time, the distributor 300 is completely released and the selector 200 rendered operative in response to impulses from the calling subscriber substation A to establish a connection to the called subscriber substation B.

The selector 200 responds to the first digit of the directory number of substation B dialed by the subscriber at substation A and operates in a well known manner to cause the Strowger mechanism 201 to step to seize an idle connector in the first group of connectors accessible to the first group of links, assumed in this case to be connector 215. Upon seizing the connector 215, the selector 200 completes a line loop circuit between the subscriber substation A and the connector switch 215 in a well known manner. The connector switch 215 operates to apply ground potential to conductor C214 and through the selector 200 in turn to conductor C118 to hold relay R160 under the control of the connector 215, the ground which had been connected to conductor C118 in the selector circuit 200 being removed at this time. Thus the selector 200 and line finder 130 are held under the control of the connector 215 in a well known manner.

The connector 215 responds to the final two digits in the called subscribers directory number and seizes the line circuit 240 of the called line 230, assuming the same to be idle. The called line is rung in the usual manner, ring-back tone being sent back to the calling party from the connector 215.

When the subscriber at the substation B answers, relay R220 in the connector switch 215 operates in a well known manner to reverse battery potential on the line conductors C212 and C213. More specifically, the ground potential through the upper winding of relay R220 which had been connected to the line conductor C213 by way of RC281 and RC283 is now transferred to line conductor C212 by way of RA285 and RC284 and the battery potential through the lower winding of relay R220 which had been connected to line conductor C212 by way of RC286 and RC284 is now transferred to line conductor C213 by way of RA282 and RC283. This reversal of potential on the line conductors C212 and C213 causes a reversal in current flow through the upper winding of the electro-polar relay R600, the circuit being traced from ground thru the upper winding of relay R220, RA285, RC284, C212, wiper 202, C116, RA161, the upper winding of relay R600, C132, wiper 141, C103, the calling subscribers substation A, C102, wiper 142, C133, RA162, C117, wiper 203, C213, RC283, RA282, to battery potential thru the lower winding of relay R220. This reversal of current in the upper winding of electro-polar relay R600 causes the field set up thereby to aid the field set up by the lower winding and the electro-polar relay R600 operates. It should be noted that relay R600 is designed so as to be slow to operate so that it will not operate on momentary line disturbances. Upon operating, relay R600 shunts its upper winding by means of RA601, the energized lower winding being sufficient to hold the relay R600 in its operated position once the relay has operated. Also, relay R600 closes a point in the circuit from timer conductor C251 to the lower winding of relay R610 at RA602 for reasons to be hereinafter explained.

It is desired that the timing and automatic disconnect of established calls feature in this system be operative only during certain fixed periods of the day, normally the periods when the traffic through the system is heaviest. Therefore, referring to Fig. 2, there is provided a timing device comprising a cam 243 driven by a synchronous motor (not shown) which rotates continuously in a manner similar to the hour hand of a clock at the rate of one revolution every twenty-four hours. Notches 244 cut in the cam 243 represent certain lengths of time in a day and are so positioned on the cam that they will cause the operation of the cam springs 241 during certain pre-selected periods of the day, normally those periods when the exchange traffic is at a peak. For instance, the cam 243 could be so arranged that notches 244 would cause cam springs 241 to close at 9 a. m. and remain closed until 10 a. m. or 10:30 a. m. and again close at 4 p. m. and remain closed until 6 p. m. every day of the week, these periods normally being among the heaviest traffic periods of the day.

A second timing device 260 is provided which determines the length of time that a call subject to timing and automatic disconnection will be allowed. This timing device 260 consists of five cams 261 to 265 inclusive driven by a synchronous motor (not shown) at constant speed, each cam having an upraised portion thereon, these upraised portions being placed relative to each other so that they will operate their associated cam springs 271 to 275 inclusive consecutively at spaced periods ranging to 2 minutes each. This timing device 260, like the timing device 243, is in continuous operation.

If the call from the first group of lines is made during one of the aforementioned heavy load time periods, the operation of relay R600 closes a circuit from the timer conductor 251 to the lower winding of relay R610 by way of closed cam springs 241, the normally closed key 242, RA602, and RA626. When this circuit is closed to the lower winding of relay R610, or soon thereafter, ground is closed to the timer conductor C251 by the closing of cam springs 271 by cam 261 and to the lower winding of relay R610 by way of cam springs 241, key 242, RA602, and RA626. Relay R610 on operating closes a circuit to its upper winding by way of RA613, RC627, RC628, RC624 and RC623 to ground standing on conductor C118 from the connector circuit 215 to hold itself operated when the ground is removed from conductor 251 by the restoration of cam springs 271, opens a point in the circuit to the signal tone relay R630 at RA611, and closes the circuit from timer conductor 252 to the lower winding of relay R620 by way of RA612. Two minutes after timing device 260 closed the ground to timer conductor 251, cam 262 causes ground to be closed to timer conductor 252 by way of cam springs 272 thus causing relay R620 to operate through its lower winding. On operating, relay R620 closes a circuit to its upper winding from ground on conductor C118 through RA625 to hold itself operated after the ground is removed from timer conductor 252 by the restoration of cam springs 272, closes a part of the circuit to signal tone relay R630 at RA621, transfers the holding circuit to the upper winding of relay R610 from conductor C118 to timer conductor 253 by way of RC627 and RA629 and thus to ground through the closed cam springs 273, transfers the holding circuit to relay R160 from ground on conductor C118 by way of RC624 and RC623 to ground on timer conductor 255 through closed cam springs 275 by way of RA622 and RC624, and opens the circuit from conductor 251 to the lower winding of relay R610 at RA626. Two minutes after cam springs 272 were operated to ground timer conductor 252, cam 263 causes ground to be removed from conductor 253 by opening cam springs 273 thus opening the circuit to the upper winding of relay R610. Relay R610 restores, closes the circuit from timer conductor 254 to signal tone relay R630 by way of RA611 and RA621, and opens a part of the circuit to the lower winding of relay R620 from timer conductor 252 at RA612. Approximately two minutes after the ground had been removed from timer conductor 253, cam 264 causes ground to be closed to conductor 254 through cam springs 274 to relay R630 by way of RA611 and RA621. Relay R630 operates to place a tone over conductor C650 to the line conductors by way of RA631 to inform the parties that they are about to be disconnected. A few seconds after relay R630 has operated to give this tone signal, cam 265 opens cam springs 275 to remove ground from conductor 255, thus opening the circuits thru RA622 and RC624 to the lower winding of relay R600 and to relay R160 by way of RA164. Relay R600 restores. Relay R160 restores, closes a circuit to the release magnet M172 by way of RA144, RC145, switch springs 186, 187, 178 and 176, RA166, RC168 and RA158, disconnects the conductors C132, C133 and C134 of conductor set 131 from conductors C116, C117 and C118 respectively of trunk line 115 at RA161, RA162 and RA163 respectively, opens a multiple circuit to the guard conductor C322 at RA169, and opens the circuit at RC167 to extinguish the lamp L128.

The release magnet M172 operates to return the Strowger switch mechanism 140 of the finder switch 130 to its normal position. When the switch mechanism 140 has reached the normal position, the vertical off-normal switches S175 and S179 return to normal. The circuit to the release magnet M172 is opened at switch springs 176 and 178 and the release magnet M172 restores. The subscriber's line circuit 100 is released. The circuit to the guard conductor C322 is transferred from ground at switch spring 180 to ground on conductor C118 from the subsequent switch train, the latter circuit being traceable from ground on conductor C118, switch springs 182 and 181, RA143, and switch springs 185 and 184 to conductor C322. The finder switch 130 is thus kept marked as busy to the distributor 300 until the subsequent switch train releases.

Opening the line conductors at RA161 and RA162 by the restoration of relay R160 causes the connector 215 to operate to remove ground from conductor C214 to release the selector 200 and remove ground from conductor C118 of the line finder 130. Removal of ground from conductor C118 causes relay R620 to restore to return the linefinder circuit 130 to normal.

As described in the aforementioned patent, the distributor 300 is operative to cause the finder switch of a selected link in the first group of links, such as the finder switch 130 of line 60, to operate and seize a calling line in the second group of lines. The finder switch 130 of the link 60 is operative in a manner substantially identical to that previously explained to find the calling line 101 in the first group of lines when the finder switch 130 is employed to find a calling line such as 106 in the second group of lines. In this case however the switch wipers of the mechanism 140 encounter battery potential on the control conductor C107 of the lower contact set, this battery on the control conductor C107 being closed over wiper 146 of the lower wiper set through RA142 to second test conductor C326 leading to distributor 300. The distributor 300 operates to remove the ground from rotary conductor C324 to thereby release the rotary magnet M171, to close ground to conductor C325 and by way of RA160 to switching relay R150. Relay R150 operates, opens a point in the circuit to the release magnet M171 at RA158, opens a point in the circuit to the rotary magnet M171 at RA157, closes ground by way of switch springs 180 and 181, RA156, and switch springs 185 and 184 to guard conductor C322 to cause the release of the distributor 300 as previously described, opens a point in the circuit to switching relay 160 at RA155, and closes a holding circuit to itself from ground on the conductor C118 through RA154. Relay R150 also closes the conductor set 135 extending to the lower wiper set of the switch mechanism 140 to the trunk line 115. More specifically, the conductors C136, C137 and C138 of conductor set 135 are respectively connected, at RA151, RA152 and RA153, to the conductors C116, C117 and C118 respectively of the trunk line 115. It is noted that the upper winding of relay R600 is not included in this circuit between trunk lines 135 and 115 and altho the lower winding of relay R600 is energized by ground at RA144 and RA146, relay R600 never operates and therefor the connections established through the linefinder from subscribers' substations in the second hundreds group of lines are never subjected to conversation timing and automatic disconnect. The finder and associated equipment is released only when the parties hang up as described in the above named patent. Thus it is apparent that calls made from subscribers' lines in one hundreds group of lines to other subscribers' lines in the same exchange are timed and automatically disconnected during certain time periods of the day while similar calls made from subscribers' lines in the second hundreds group of lines are not timed and automatically disconnected.

It is desirable that connections established through the line finder switch 130 from subscriber lines in either the first or second hundreds group of lines to an operator's position have an unlimited conversation time period, the disconnection of the switch train being placed under the control of the called operator. This circuit is arranged to prevent the conversation timing equipment from operating on any call to an operator's position. On a call from a subscriber line in either group of lines, the linefinder operates to find the calling line and seize the selector switch as previously described. On calls from lines in the first group of lines, the upper winding of relay R600 will be connected in series with the line conductor C116 while on calls from lines in the second group of lines the upper winding of relay R600 will be omitted from the line conductor circuit as described. As previously noted, when relay R160 operates on calls from lines in the first group of lines it closes ground potential on line conductor C117 from the selector switch 200 to one side of the upper winding of relay R600 by way of RA162 and the loop in the subscriber station A and battery potential on line conductor C116 from the selector switch 200 to the other side of the upper winding of relay R600 by way of RA161. As noted, relay R600 will not operate with the potential on its upper winding connected in this manner, the relay being designed to operate only when the potential to its upper winding is reversed. On a call through the selector 200 to operator's position 210, there is no reversal of battery on the line leads when the operator answers as occurred when the subscriber at station B answered. Since there is no reversal of battery potential on the line conductors, relay R600 never operates and the conversation timing feature is never operative on calls to an operator's position.

It is also desirable that manual control of the conversation timing feature be provided to proper parties, at least to the extent that that person may disable the feature during the period that it is normally operative. This to take care of the situation where light traffic during the normally heavy traffic period does not warrant the use of conversation timing. A key 242 is provided at a convenient place such as the operator's position or exchange attendant's desk for disabling conversation timing. Manual operation of the key 242 opens a point in the circuit from the cam springs 271 of timer device 260 to the lower winding of relay R610, thus preventing the operation of relay R610 at any time even though relay R600 may have been operated. Failure of relay R610 to operate renders the conversation timing feature inoperative.

A second method of determining the subscriber lines which are to receive the timing service is by means of finder switch bank levels. As pointed out in the aforementioned patent, the finder switch comprises a switching mechanism of the Strowger type including a bank of fixed contact sets arranged in ten vertical levels, each level including upper and lower rows of contact sets, each row of contact sets including ten radically disposed contact sets, each contact set terminating a subscriber line. It is therefore possible, by means of a pair of switch springs fixedly attached to the shaft of the switch mechanism and moveable vertically therewith which may be arranged to be mechanically operated or to remain unoperated on different ones of the ten levels of the switch bank when the switch carriage or shaft raises the wipers to those certain bank levels, to discrimiate between different levels of subscribers' lines as to the timing service. The following description shows a method whereby the subscriber lines in one or more of the bank levels may have the timing service by arranging that the shaft springs remain unoperated when the switch wipers reach those particular levels while the subscriber lines on the remaining levels will not have the timing service by providing that the shaft springs operate when the switch wipers reach those levels.

Referring now to Fig. 4, there is shown therein a finder switch 430 similar in many respects to the finder switch 130 described above. Components in Fig. 4 which are similar to components in Fig. 1 have been numbered so that the tens and units digits are the same as those designating said last components to thereby facilitate an understanding of the operation of Fig. 4.

The finder switch 430 of Fig. 4 differs from the finder switch 130 of Fig. 1 in that the upper winding of the electro-polar relay R700 in Fig. 4 is connected in series with the line conductor C416 of trunk line 415 rather than in series with line conductor C432 of conductor set 431 so that it may be operated on connections established from either hundreds group of subscriber lines; also the finder switch 430 of Fig. 4 is provided with a well known Strowger normal post switch shaft spring S473 which may be mechanically operated in a well known manner at any desired level of the Strowger switch during vertical stepping of the switch mechanism 440.

The finder switch 430 operates in conjunction with distributor 300, selector circuit 200, and connector circuit 215 to establish a connection between the calling subscriber line 101 in the first group of lines or a line 106 in the second group of lines and a called subscriber line 230 in a manner similar to that of finder switch 130 in Fig. 1 with certain modifications. It is noted that the shaft springs S473 of finder switch 430, when closed, shunt the upper winding of electro-polar relay R700. The lower winding of relay R700 is energized when start relay R440 operates on seizure of the finder switch 430 by way of RA444 and RC446, electro-polar relay R700 not operating on the power of this winding alone. If the call is being made from a subscriber whose line is terminated in a contact set on a bank level of the finder 430 which is to have conversation timing, the shaft springs S473 will not be closed when the wipers of the finder switch 430 are stepped to that level. The upper winding of electro-polar relay R700 will be closed in series with the line conductors of the calling subscriber line in either the first or second hundred groups of lines when switching relays R450 or R460 operate by way of RA451 or RA461 respectively and electro-polar relay R700 will operate upon reversal of potential back on the line conductor from the connector 215 when the called line answers. The finder switch 430 will then operate in a manner similar to that described previously to time and automatically disconnect the established connection through the linefinder 430.

If the call through finder switch 430 is from a line located on a level of the switch bank of the finder 430 which is not to have conversation timing, the finder switch mechanism is so arranged that the shaft springs S473 will be closed when the switch wipers step to that level and the upper winding of electro-polar relay R700 thereby shunted. Thus when the called subscriber answers the call, the battery reversal on the line conductors in the connector 215 will not cause electro-polar relay R700 to operate, the conversation timing equipment thereby remaining disabled.

On calls to an operator's position, such as 210, reversal of battery never occurs and relay R700 will not operate even on calls from subscriber lines on bank levels having conversation timing, thus calls to an operator's position are not timed.

A proper person also has control of the conversation timing feature by means of key 242 as previously explained.

The previous explanation dealt with periodic conversation timing in a linefinder whereby the determination of whether or not a subscriber line with access to the linefinder was to have the conversation timing was made on a group basis, one method being to distinguish between lines depending on the hundreds group in which the line was located and the second method of group discrimination being to distinguish between the lines according to the bank level of the finder switch in which they terminate. It might be thought more desirable to have a system whereby there would be individual discrimination rather than group discrimination, a system whereby the timing and disconnect service could be given to any desired subscriber line in either of the hundreds group of lines and on any level of the switch banks while other subscriber lines in the same hundreds group and on the same switch level would not have the service. Such a third method is disclosed in Fig. 5 taken in conjunction with Figs. 2 and 3, Fig. 5 disclosing a finder circuit 530 similar to the finder circuit 130 of Fig. 1 but having a fourth bank contact and wiper in every set of bank contacts and switch wipers associated with each line having access to the linefinder, linefinder 530 also having additional springs RA559 and RA560' found on the switching relays R550 and R560, respectively. Components in Fig. 5 which are similar to components in Fig. 1 have been numbered so that the tens and units digits are the same as those designating said last components to thereby facilitate an understanding of the operation of Fig. 5, components having a designation with the hundreds digits of 1 and 6 in Fig. 1 labeled with a designation having the hundreds digits 5 and 8, respectively, in Fig. 5. The subscribers lines which are to have conversation timing have the fourth bank contact, such as 591, of the set of contacts terminating that particular line strapped together and connected to the timer conductor 251 by way of key 242 and cam springs 271. Those subscriber lines which are not to have conversation timing have the fourth bank contact associated therewith standing disconnected.

The finder switch 530 operates in a manner similar to that of finder switch 130 to establish a connection to the called subscriber line 230 through the finder circuit 530, selector 200, connector 215 and line circuit 240. In this case, however, when switching relay R560 operates on calls from subscriber lines in the first hundred group of lines in a manner similar to that described for switching relay R160 in finder 130, it closes a part of the circuit from the timer conductor 251 to the lower winding of relay 810, this circuit being traceable from the conductor 251, through cam springs 241, key 242, fourth bank contact 591, wiper 592, RA560', RA802 and RA826 and when switching relay R550 operates on calls from subscribers' lines in the second hundred group of lines in a manner similar to that described for switching relay R150 in finder 130, it closes a part of the circuit from the timer conductor 251 to the lower winding of relay 810 by way of cam springs 241, key 242, fourth bank contact 594, switch wiper 593, RA559, RA802 and RA826. Electro-polar relay R800 operates on reversal of battery over the line conductors from the connector 215 when the called subscriber answers as described, closing the circuit previously traced from the timer conductor 251 to the lower winding of relay 810 at RA802, assuming that the call is made during one of the "peak load" periods of the day. Relay 810 operates and subsequent operations are the same as that described for finder 130 to time and disconnect the connection through the linefinder. It is evident that if the fourth bank contacts 591 or 594 had not been wired as explained but had been left disconnected, operation of relay R800 on reversal of battery potential on the line conductors would not have caused subsequent operation of relay R810 since the circuit would be open at bank contact 591 or 594. Thus, timing and automatic disconnect would not take place.

It is to be noted that the conversation timing would not be operative on calls to an operator's position and also that the key 242 provides manual control of the conversation timing, for the same reasons as previously explained.

It should be noted that in all three methods explained above, once the conversation timing circuit begins to operate, it cannot be halted except by the voluntary release of the connection by the parties. In other words, operation of the key 242 or cam springs 241 to open the circuit to the lower winding of relay 610 (in Fig. 1) will have no effect after relay 610 has operated since it locks operated through its upper winding. Relay 600 (Fig. 1) remains operated by means of its lower winding to also prevent a subscriber from causing a break in the conversation timing by a momentary flick of the hookswitch causing a momentary reversal of battery back on the line conductors.

Having described a preferred embodiment of the invention, it is to be understood that various modifications may be made therein, and the appended claims are intended to cover all such modifications as fall within the true spirit and scope of the invention.

What is claimed is:

1. In a telephone system for establishing connections between calling lines in first and second groups of calling lines and called lines in first and second groups of called lines, circuit means for automatically interrupting an established talking connection, second circuit means for operating said first circuit means only on connections established from calling lines in said first group of calling lines to called lines in said first group of called lines, said second circuit means being inoperative to interrupt connections established from calling lines in said first group of calling lines to called lines in said second group of called lines and from calling lines in said second group of calling lines to called lines in said first and second groups of called lines, a clock device controlling said second circuit means, means operated by said clock device during fixed time periods of the day to render said second circuit means operative only during said fixed time periods of the day, a timer device controlling said second circuit means, means operated by said timer device to render said second circuit means operative a certain period of time after the connection is established, and a manual switching means for disabling said first circuit means.

2. In a telephone system, first and second groups of lines, a linefinder circuit having access to said lines, first and second sets of conductors in said linefinder for establishing a connection through said linefinder from lines in said first and second groups of lines, respectively, a control relay connected in only said first set of conductors, means for operating said relay on connections established over only said first trunk line, and circuit discriminating means associated with said relay and rendered operative in response to the operation of said relay for controlling only the connections extended from calling lines in said first group.

3. In a telephone system, a two hundred point linefinder having access to subscriber's line terminal sets divided into two groups of one hundred line sets each, means for completing a talking connection from any one subscriber line terminal set in either of said groups through said linefinder, circuit means in said linefinder operative to automatically interrupt the talking connection established therethrough, a second circuit means operative to cause operation of said first circuit means only on connections established from line terminal sets in one of the hundreds groups of line terminal sets, said second circuit means being inoperative to cause interruption of connections established from line terminal sets in the other of said hundreds groups of line terminal sets, a clock device for keeping the time of day, means operated by said clock device during a certain fixed time period of the day, a timer device for measuring a length of time, means operated by said timer device a certain period of time after a connection is established through said linefinder, said second circuit means controlled jointly by said clock operated means and said timer operated means so as to be operated only during said fixed time period and only after the expiration of said certain period of time.

4. In a telephone system as claimed in claim 3, a manual switching means for rendering said second circuit means inoperative.

5. In a telephone system, a two hundred point linefinder having access to subscriber's line terminal sets divided into a first and second group of one hundred line terminal sets each, a first and second incoming path in said linefinder, the line terminal sets in said first group of line terminal sets accessible from said linefinder over said first incoming path, the line terminal sets in said second group of line terminal sets accessible from said linefinder over said second incoming path, means for establishing a talking connection through said linefinder from line terminal sets in said first group of line terminal sets over said first incoming path and from line terminal sets in said second group of line terminal sets over said second trunk line, circuit means associated only with said first incoming path operative to automatically interrupt the talking connection established thereover, a timer device for measuring a length of time, means operated by said timer device a certain period of time after a connection is established over said first incoming path, a clock device for keeping the time of day, means operated by said clock device only during certain fixed time periods of the day, said circuit means controlled jointly by said clock operated means and said timer operated means so as to cause the talking connections established over the first incoming path from line terminal sets in the first group of subscriber's line terminal sets to be interrupted only during certain fixed time periods of the day, connections established over said second incoming path remaining uninterrupted at all times.

6. In a telephone system as claimed in claim 5, a key for disabling said timer device to render said circuit means inoperative during said certain fixed time periods.

7. In a telephone system, a step-by-step linefinder comprising a ten level contact bank having a plurality of sets of four terminal contacts associated with each level, three contacts of different ones of said sets of contacts being subscriber's line terminals accessible from said linefinder, means for completing a connection from any of said subscriber line terminal sets through said linefinder, a clock device for keeping the time of the day, means operated by said clock device during a certain fixed time period of the day, a timer device for measuring off a length of time, means operated by said timer after a certain period of time, circuit means in said linefinder for automatically interrupting the talking connection established therethrough, a second circuit means including the fourth contact in the set of bank contacts of certain terminal sets for operating said first circuit means to cause interruption only of connections established from said certain line terminal sets, and means controlled jointly by said clock operated means and said timer operated means for causing said second circuit means to be operative only during said fixed time periods of the day and a certain period of time after the connection is established.

8. In a telephone system, as claimed in claim 7, a key circuit for manually disabling said second circuit means.

9. In a telephone system, a linefinder comprising a bank of contacts having a plurality of levels, a plurality of subscribers' lines accessible from said linefinder terminating in sets of contacts in each of said levels, means for completing a connection from any of said lines through said linefinder, circuit means operative to automatically interrupt said talking circuit, a timer device for measuring a length of time, means operated by said timer device for rendering said circuit means operative only after a certain period of time has elapsed after the connection was established, a pair of vertical springs in said linefinder, means for operating said springs on connections established over lines terminating in certain levels of said contact bank, a second circuit means including said operated vertical springs for disabling said first circuit means to thereby prevent automatic interruption of connections established from lines in said certain bank levels, lines in the other bank levels having uninterrupted service, a clock device for keeping the time of the day, and means operated by said clock device for controlling said first circuit means to cause it to be operative only during certain times of the day.

10. In a telephone system, a linefinder comprising a ten level bank of contacts, a plurality of sets of contacts in each of said levels, each of said sets being a subscriber's line terminal set accessible from said linefinder, means for completing a connection from any of said line terminal sets through said linefinder, a clock device for keeping the time of the day, means operated by said clock device during certain times of the day, a timer device for measuring a length of time, means operated by said timer device after a certain period of time, circuit means in said linefinder responsive to said clock and timer devices for automatically interrupting the talking connection established therethrough a certain period of time after it was established and only during certain times of the day, a pair of vertical springs in said linefinder, means for operating said springs on connections established over line terminal sets in certain levels of said contact bank, and a second circuit means including the operated pair of vertical springs for disabling said first circuit means to thereby prevent interruption of the connection established from line terminal sets in said certain level.

11. In a telephone system as claimed in claim 10, a key for manually disabling said first circuit means.

12. In a telephone system comprising a linefinder switching circuit for use in establishing connections from subscriber lines divided into a plurality of groups of lines, a first wiper set in said linefinder for connection with calling lines in only one of said groups of subscriber lines, a second wiper set in said linefinder for connection with calling lines in another of said groups of subscriber lines only, a first incoming path in said linefinder connected to said first wiper set for use in establishing a connection thereover, a second incoming path in said linefinder connected to said second wiper set for use in establishing a connection thereover, a timer device for measuring off a particular length of time, a control relay connected only in said first incoming path, means for operating said relay only when a connection is extended from a line over said first set of wipers, means for interrupting a connection established through said linefinder, and means controlled by such operation of said control relay for causing said timing device to in turn operate said interrupting means to thereby interrupt only connections established over said first incoming path and only after expiration of a certain period of time.

13. In a telephone system comprising a linefinder switching circuit for use in establishing connections between calling lines divided into a plurality of groups of calling lines and called lines divided into a plurality of groups of called lines, a first wiper set in said linefinder for connection with calling lines in only one of said groups of calling lines, a second wiper set in said linefinder for connection with calling lines in another of said groups of calling lines, a first incoming path in said linefinder connected to said first set of wipers for use in establishing a connection thereover, a second incoming path in said linefinder connected to said second wiper set for use in establishing a connection thereover, an outgoing path in said linefinder common to said incoming paths for use in establishing connections over either of said incoming paths with called lines in either of said groups of called lines, means for interrupting an established connection through said linefinder, an electro-polar relay connected in only said first incoming path, means for operating said electro-polar relay only on calls to a particular one group of called lines over said first incoming path, a timer device for measuring off a particular length of time, a first contact means operated by said timer device a certain length of time after the establishment of a connection and second contact means operated by said electro-polar relay when operated, and circuit means operated jointly by said operated first and second contact means to thereby operate said interrupting means.

14. In a telephone system as claimed in claim 13, a clock device for keeping the time of the day, a third contact means operated by said clock device during certain time periods of the day, said third contact means also controlling said circuit means to cause operation thereof by said first and second contact means only during certain time periods of the day.

CLARENCE E. LOMAX.

References Cited in the file of this patent

UNITED STATES PATENTS

| Number | Name | Date |
|---|---|---|
| 2,085,624 | Allen | June 29, 1937 |
| 2,333,039 | Peterson | Oct. 26, 1943 |